(12) United States Patent
Sakaguchi et al.

(10) Patent No.: US 12,467,856 B2
(45) Date of Patent: Nov. 11, 2025

(54) GAS ANALYSIS DEVICE AND GAS ANALYSIS METHOD

(71) Applicants: HORIBA STEC, Co., Ltd., Kyoto (JP); HORIBA, LTD., Kyoto (JP)

(72) Inventors: Yuhei Sakaguchi, Kyoto (JP); Masakazu Minami, Kyoto (JP); Kyoji Shibuya, Kyoto (JP); Motonobu Takahashi, Kyoto (JP)

(73) Assignees: HORIBA STEC, CO., LTD., Kyoto (JP); HORIBA, LTD., Kyoto (JP)

( * ) Notice: Subject to any disclaimer, the term of this patent is extended or adjusted under 35 U.S.C. 154(b) by 83 days.

(21) Appl. No.: 18/039,316

(22) PCT Filed: Nov. 22, 2021

(86) PCT No.: PCT/JP2021/042823
§ 371 (c)(1),
(2) Date: May 30, 2023

(87) PCT Pub. No.: WO2022/118694
PCT Pub. Date: Jun. 9, 2022

(65) Prior Publication Data
US 2023/0417660 A1 Dec. 28, 2023

(30) Foreign Application Priority Data
Dec. 1, 2020 (JP) .................. 2020-199826

(51) Int. Cl.
*G01N 21/3504* (2014.01)
*G01N 21/03* (2006.01)
*G01N 21/39* (2006.01)

(52) U.S. Cl.
CPC ..... *G01N 21/3504* (2013.01); *G01N 21/0332* (2013.01); *G01N 21/39* (2013.01); *G01N 2201/127* (2013.01)

(58) Field of Classification Search
CPC .......... G01N 21/3504; G01N 21/0332; G01N 21/39; G01N 2201/127
See application file for complete search history.

(56) References Cited

U.S. PATENT DOCUMENTS

| | | | |
|---|---|---|---|
| 2010/0238446 A1* | 9/2010 | Akiyama | G01N 21/05 356/246 |
| 2015/0059435 A1* | 3/2015 | Choudhury | G01N 21/1702 73/19.03 |

(Continued)

FOREIGN PATENT DOCUMENTS

| | | |
|---|---|---|
| CN | 110426371 | 11/2019 |
| JP | 2004-184409 | 7/2004 |

(Continued)

OTHER PUBLICATIONS

International Search Report issued in International Patent Application No. PCT/JP2021/042823, dated Jan. 11, 2022.

(Continued)

*Primary Examiner* — Jamil Ahmed
(74) *Attorney, Agent, or Firm* — GREENBLUM & BERNSTEIN, P.L.C.

(57) ABSTRACT

The present invention is a gas analysis device that measures a concentration or partial pressure of a halide contained in a material gas used in semiconductor manufacturing process or a by-product gas generated in semiconductor manufacturing process with good accuracy, the device being for analyzing a concentration or partial pressure of a halide contained in a material gas used in a semiconductor manufacturing process or a by-product gas generated in a semiconductor manufacturing process, the device including a gas cell into which the material gas or the by-product gas is introduced, a laser light source that irradiates the gas cell with laser light whose wavelength is modulated, a light detector that detects the laser light transmitted through the (Continued)

gas cell, and a signal processing unit that calculates the concentration or partial pressure of the halide by using a light absorption signal obtained from an output signal of the light detector.

11 Claims, 15 Drawing Sheets

(56) References Cited

U.S. PATENT DOCUMENTS

2015/0368794 A1 12/2015 Morita et al.
2016/0231239 A1* 8/2016 Kotidis ................. H01S 5/3401

FOREIGN PATENT DOCUMENTS

| | | |
|---|---|---|
| JP | 2013-181930 | 9/2013 |
| JP | 2018-513968 | 5/2018 |
| TW | I221518 | 10/2004 |
| WO | 2014/123028 | 8/2014 |
| WO | 2016/047168 | 3/2016 |

OTHER PUBLICATIONS

Taiwan, Office Action and Search Report received in Application No. 110144495, dated May 6, 2025, and English language translation thereof.

Japan, Notice of Reasons for Refusal received in JP patent application No. 2022-566850, dated Sep. 4, 2025, and English language translation thereof.

* cited by examiner

GAS ANALYSIS DEVICE AND GAS ANALYSIS METHOD

TECHNICAL FIELD

The present invention relates to a gas analysis device and a gas analysis method.

BACKGROUND ART

Conventionally, as shown in Patent Literature 1, a device using a non-dispersive infrared absorption method (NDIR) is considered as a device that measures a component to be measured contained in a material gas used in a semiconductor manufacturing process or a by-product gas generated in a semiconductor manufacturing process. In the gas analysis device using the NDIR, absorption of light by a component to be measured is measured using an infrared light source that generates light of a wide wavelength, such as a filament, and a band pass filter that transmits light of a predetermined wavelength range.

Here, in the case of measuring $SiF_4$ or $CF_4$ contained in the material gas used in a semiconductor manufacturing process or the by-product gas generated in a semiconductor manufacturing process, the presence of another interference component having absorption in the same wavelength range causes $SiF_4$ or $CF_4$ to receive interference influence from the component. When the wavelength range of the band pass filter is narrowed to reduce the interference influence, the amount of light to be detected by a light detector decreases, and the light becomes difficult to be measured with high accuracy.

CITATION LIST

Patent Literature

Patent Literature 1: JP 2013-181930 A

SUMMARY OF THE INVENTION

Technical Problem

The present invention has been made to solve the above problem. A main object of the present invention is to measure the concentration or partial pressure of a halide contained in a material gas used in a semiconductor manufacturing process or a by-product gas generated in a semiconductor manufacturing process with high accuracy.

Solution to Problem

That is, a gas analysis device according to the present invention is a gas analysis device for analyzing a concentration or partial pressure of a halide contained in a material gas used in a semiconductor manufacturing process or a by-product gas generated in a semiconductor manufacturing process, the gas analysis device including a gas cell into which the material gas or the by-product gas is introduced, a laser light source that irradiates the gas cell with laser light whose wavelength is modulated, a light detector that detects the laser light transmitted through the gas cell, and a signal processing unit that calculates the concentration or partial pressure of the halide by using a light absorption signal obtained from an output signal of the light detector, wherein the gas cell is decompressed to a predetermined pressure lower than atmospheric pressure, and the laser light source modulates the wavelength of the laser light in a wavelength modulation range including a feature part of the light absorption signal of the halide.

Such a gas analysis device, in which the gas cell decompressed to a predetermined pressure lower than atmospheric pressure is irradiated with laser light whose wavelength is modulated in a wavelength modulation range including the feature part of the light absorption spectrum of a halide, can accurately grasp the feature of the light absorption spectrum of the halide and can easily remove the influence of the interference component on the light absorption signal of the halide. Here, since the gas cell is decompressed to a predetermined pressure, a sharper peak than that of the light absorption signal of the halide under atmospheric pressure is obtained, and the influence of the interference component on the light absorption signal of the halide can be reduced. In the conventional NDIR, the light absorption spectrum of a halide cannot be obtained. However, the present invention, in which a light absorption signal corresponding to the light absorption spectrum can be obtained, can reduce the interference influence with the spectrum analysis technique even with interference of absorption by a plurality of components.

The feature part of the light absorption spectrum is, for example, a part including a peak and a valley or a skirt (rising part) of the light absorption spectrum. Modulating the wavelength of the laser light at the part including the peak and the valley or the skirt of the light absorption spectrum in this manner can increase the contrast in the output signal of the light detector and can easily remove the influence of the interference component.

$SiF_4$ as a fluoride has an optical absorption spectrum with two peaks around 1034 $cm^{-1}$ and around 1030 $cm^{-1}$ and a valley around 1031 $cm^{-1}$ under a certain reduced pressure, and the peak around 1030 $cm^{-1}$ is the largest. Thus, to measure the concentration or partial pressure of $SiF_4$ with high accuracy, the wavelength modulation range is desirably set to have a wavenumber width including a part or all of 1030.5 $cm^{-1}$ to 1031.5 $cm^{-1}$. Here, the wavelength modulation range is desirably set to have a wavenumber width including a part or all of 1029 $cm^{-1}$ to 1032 $cm^{-1}$. Examples of the interference component of $SiF_4$ in a semiconductor manufacturing process include $NF_3$, $CH_3F$, $NH_3$, and other by-products. The interference influence of these components can be easily removed by using the above-described wavelength modulation range.

$CF_4$ as a fluoride has a peak in the range of 1282.5 $cm^{-1}$ to 1283.5 $cm^{-1}$ in its light absorption spectrum under a certain reduced pressure. Thus, to measure the concentration or partial pressure of $CF_4$ with high accuracy, the wavelength modulation range is desirably set to have a wavenumber width including a part or all of 1282.5 $cm^{-1}$ to 1283.5 $cm^{-1}$. Here, the wavelength modulation range is desirably set to have a wavenumber width including a part or all of 1281.5 $cm^{-1}$ to 1284.5 $cm^{-1}$. Examples of the interference component of $CF_4$ in a semiconductor manufacturing process include $C_2H_2F_2$, $C_4F_8$, $COF_2$, and other by-products. The interference influence of these components can be easily removed by using the above-described wavelength modulation range.

To measure the concentration or partial pressure of two components of $SiF_4$ and $CF_4$ which are halides containing fluorine with high accuracy, it is desirable that the laser light source include a first laser light source set to have a wavenumber width of the wavelength modulation range including a part or all of 1030.5 $cm^{-1}$ to 1031.5 $cm^{-1}$, and a second laser light source set to have a wavenumber width of the wavelength modulation range including a part or all of 1282.5 cm$^{-1}$ to 1283.5 cm$^{-1}$. Two components of SiF$_4$ and CF$_4$ in the material gas or the by-product gas can be simultaneously measured by having the first laser light source and the second laser light source as described above.

As described above, as a specific embodiment, it is desirable that the signal processing unit corrects an influence of an interference component on the light absorption signal of the halide with spectral analysis to calculate the concentration or partial pressure of the halide.

To measure a halide having a low concentration or a low partial pressure with high accuracy, it is desirable that the gas cell is provided with a pair of reflection mirrors inside to multiply reflect the laser light.

To make it difficult for the component contained in the material gas or the by-product gas to adhere to the gas cell and prevent deterioration of measurement accuracy, it is desirable to include a heating mechanism that heats the gas cell.

To calculate the concentration or partial pressure of the halide with high accuracy with the signal processing unit, it is desirable to include a pressure sensor that measures a pressure in the gas cell.

As a specific disposition mode of the gas cell, it is conceivable that the gas cell is provided in a chamber in which a semiconductor manufacturing process is performed or a piping connected to the chamber.

It is desirable that the piping is provided with a vacuum pump that evacuates the chamber, and the gas cell is provided closer to the chamber than the vacuum pump is.

More specifically, it is desirable that the piping is provided with a pressure control valve that controls a pressure in the chamber, the pressure control valve being provided closer to the chamber than the vacuum pump is, and an inlet port of the gas cell is connected to an upstream side of the pressure control valve, and an outlet port of the gas cell is connected to a downstream side of the pressure control valve.

The gas cell may be formed of a chamber in which a semiconductor manufacturing process is performed This configuration enables a direct measurement of the gas generated from a wafer, for example.

A gas analysis method according to the present invention is a gas analysis method for analyzing a concentration or partial pressure of a halide contained in a material gas used in a semiconductor manufacturing process or a by-product gas generated in a semiconductor manufacturing process, the gas analysis method including introducing the material gas or the by-product gas into a gas cell, irradiating the gas cell with laser light whose wavelength is modulated, detecting the laser light transmitted through the gas cell, and calculating the concentration or partial pressure of the halide by using a light absorption signal obtained from an output signal of a light detector, wherein the gas cell is decompressed to a predetermined pressure lower than atmospheric pressure, and the wavelength of the laser light is modulated in a wavelength modulation range including a feature part of the light absorption signal of the halide.

Advantageous Effects of Invention

The present invention described above can measure the concentration or partial pressure of a halide contained in a material gas used in a semiconductor manufacturing process or a by-product gas generated in a semiconductor manufacturing process with high accuracy.

Figure 1:
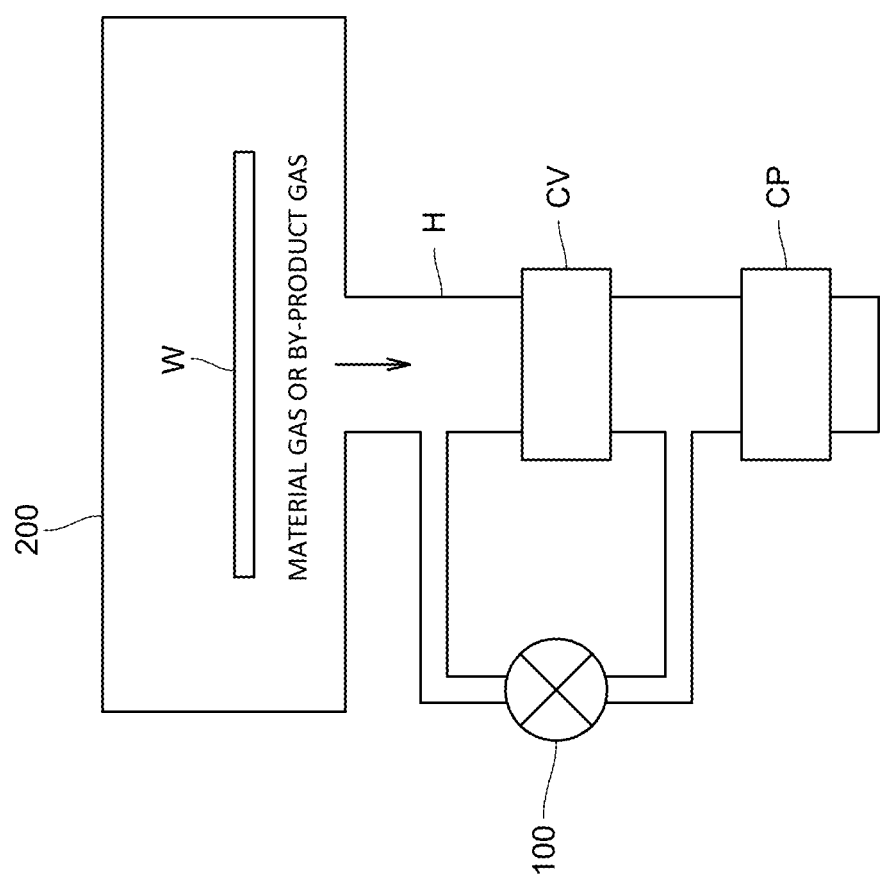
FIG. 1 is a diagram schematically illustrating a semiconductor manufacturing apparatus incorporating a gas analysis device according to an embodiment of the present invention.

REFERENCE SIGNS LIST 100 gas analysis device
200 chamber
H piping
CP vacuum pump
2 gas cell
3 laser light source
4 light detector
52 signal processing unit
M1, M2 reflection mirror
6 heating mechanism
7 pressure sensor 31 first laser light source
32 second laser light source

DESCRIPTION OF EMBODIMENT

Hereinafter, a gas analysis device according to an embodiment of the present invention will be described with reference to the drawings.

<Device Configuration>

A gas analysis device 100 of the present embodiment is used by being incorporated in a semiconductor manufacturing apparatus, and it measures, with an infrared absorption method, the concentration or partial pressure of a halide as a component to be measured contained in a material gas used in a semiconductor manufacturing process or a by-product gas generated in a semiconductor manufacturing process (hereinafter, they are simply referred to as "gas"), for example. Here, examples of the halide include a fluoride, a chloride, and a bromide.

As illustrated in FIG. 1, the gas analysis device 100 may be incorporated in, for example, an etching apparatus that performs reactive ion etching (RIE) and used as an endpoint monitor of reactive ion etching (RIE) for a wafer W. In this case, it is conceivable that the gas analysis device 100 measures the concentration or partial pressure of $SiF_4$ or $CF_4$ contained in the gas.

Figure 2:
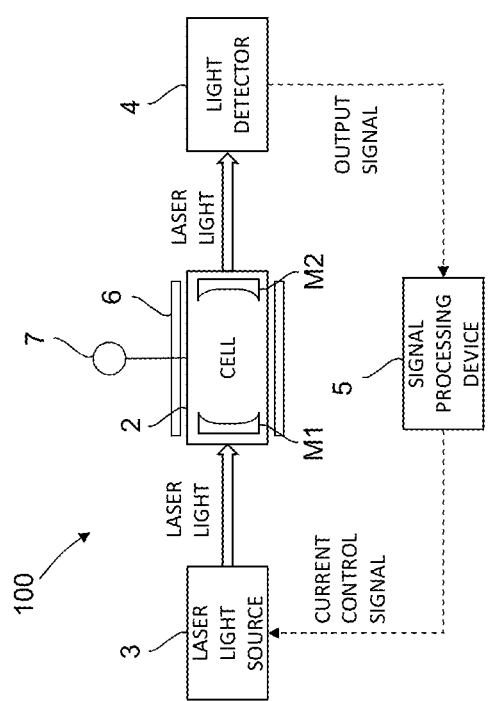
FIG. 2 is an overall configuration diagram of the gas analysis device of the embodiment.

Specifically, as illustrated in FIG. 2, the gas analysis device 100 includes a gas cell 2 into which the gas is introduced, a laser light source 3 that irradiates the gas cell 2 with laser light whose wavelength is modulated, a light detector 4 that detects the laser light transmitted through the gas cell 2, and a signal processing device 5 that calculates the concentration or partial pressure of the halide using a light absorption signal obtained from an output signal of the light detector 4.

The gas cell 2 is formed with a light entrance port and an exit port made of a transparent material, such as quartz, calcium fluoride, barium fluoride, or zinc selenide, which hardly absorbs light in an absorption wavelength band of a halide. The gas cell 2 is provided with an inlet port for introducing gas to the inside and an outlet port for discharging the material gas or by-product gas from the inside, and the gas is introduced into the gas cell 2 from the inlet port and sealed inside. The gas cell 2 is provided with a pair of reflection mirrors M1 and M2 inside. The gas cell 2 is a so-called Herriott cell, which causes multiple reflections of laser light.

The gas cell 2 of the present embodiment is connected to a chamber 200 in which a semiconductor manufacturing process is performed. In the present embodiment, as illustrated in FIG. 1, the gas cell 2 is connected to a piping H connected to the chamber 200. The piping H is provided with a pressure control valve CV that controls the pressure of the chamber 200 and a vacuum pump CP that evacuates the chamber 200 in this order. The gas cell 2 is provided on the chamber 200 side with respect to the vacuum pump CP, the inlet port of the gas cell 2 is connected to the upstream side of the pressure control valve CV, and the outlet port of the gas cell 2 is connected to the downstream side of the pressure control valve CV. This causes the gas cell 2 to be decompressed to a predetermined pressure (for example, 10 Torr or less) lower than atmospheric pressure (101.3 kPa).

In addition, as illustrated in FIG. 2, a heating mechanism 6 such as a heater using an electric heating wire for heating the inside of the gas cell 2 to a predetermined temperature (for example, 200° C.) is provided around the gas cell 2. The gas cell 2 is provided with a pressure sensor 7 that measures the pressure (total pressure) of the gas. The pressure sensor 7 may be provided at a position other than the gas cell 2 as long as it can measure the pressure of the gas.

Here, the laser light source 3 is a quantum cascade laser (QCL), which is a type of semiconductor laser, and it oscillates mid-infrared (4 to 10 μm) laser light. The laser light source 3 can modulate the oscillation wavelength in a predetermined wavelength modulation range with a given current (or voltage). The laser light source 3 of the present embodiment can modulate the oscillation wavelength in a wavelength modulation range including the feature part of the light absorption signal of the halide. Another type of laser may be used as long as the oscillation wavelength can be changed, and the temperature may be changed to change the oscillation wavelength.

For the light detector 4, a light detector of relatively inexpensive thermal type, such as thermopile, is used here. However, another type may be used, and for example, a quantum type photoelectric device having good responsiveness such as HgCdTe, InGaAs, InAsSb, or PbSe may be used.

Figure 3:
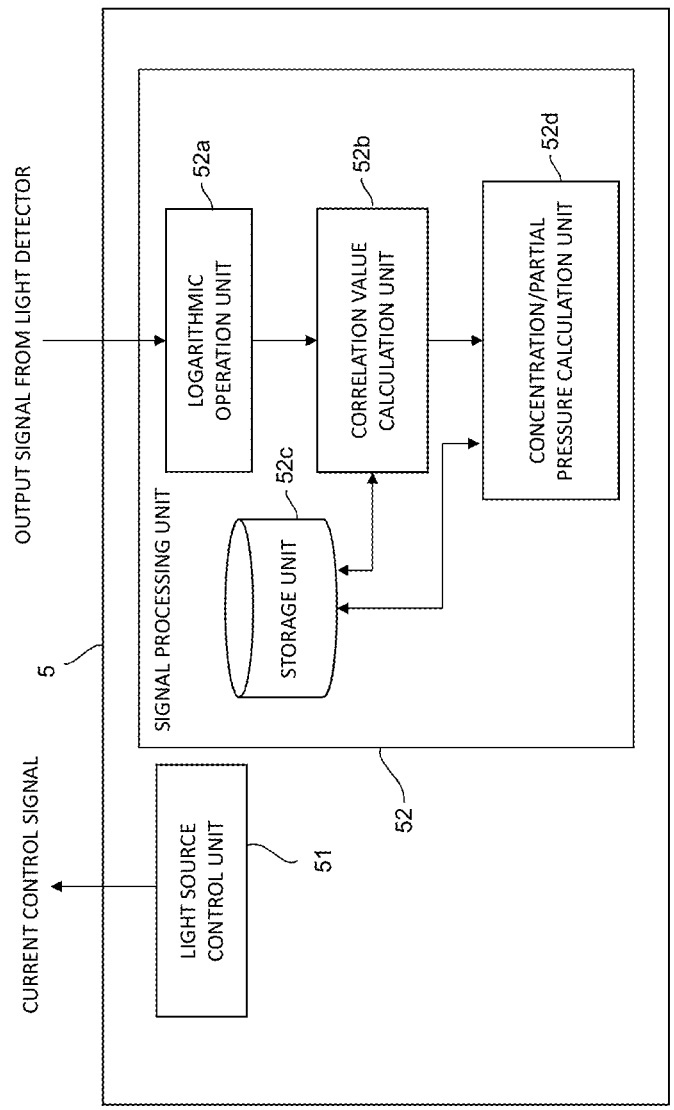
FIG. 3 is a functional block diagram of a signal processing device according to the embodiment.

The signal processing device 5 includes an analog electric circuit including a buffer and an amplifier, a digital electric circuit including a CPU and a memory, and an AD converter and a DA converter that mediate between the analog/digital electric circuits. With the cooperation between the CPU and its peripheral devices according to a predetermined program stored in a predetermined area of the memory, the signal processing device 5 exerts the functions as a light source control unit 51 that controls the output of the laser light source 3 and as a signal processing unit 52 that receives an output signal from the light detector 4 and performs arithmetic processing on the value to calculate the concentration or partial pressure of the component to be measured, as illustrated in FIG. 3.

Each unit will be described in detail below.

The light source control unit 51 controls a current source (or voltage source) of the laser light source 3 by outputting a current (or voltage) control signal.

Specifically, the light source control unit 51 modulates the oscillation wavelength of the laser light at a predetermined frequency with respect to the center wavelength by changing the drive current (or drive voltage) of the laser light source 3 at a predetermined frequency. This causes the laser light source 3 to emit modulated light that is modulated at a predetermined modulation frequency. The light source control unit 51 modulates the oscillation wavelength of the laser light in a wavelength modulation range including the feature part of the light absorption signal of the halide.

Figure 4:
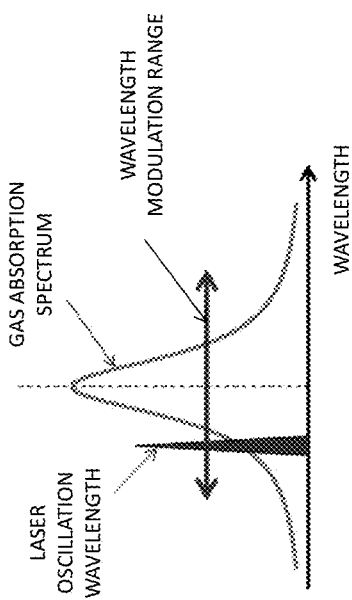
FIG. 4 is a schematic diagram illustrating a method for modulating a laser oscillation wavelength in the embodiment.
Figure 5:
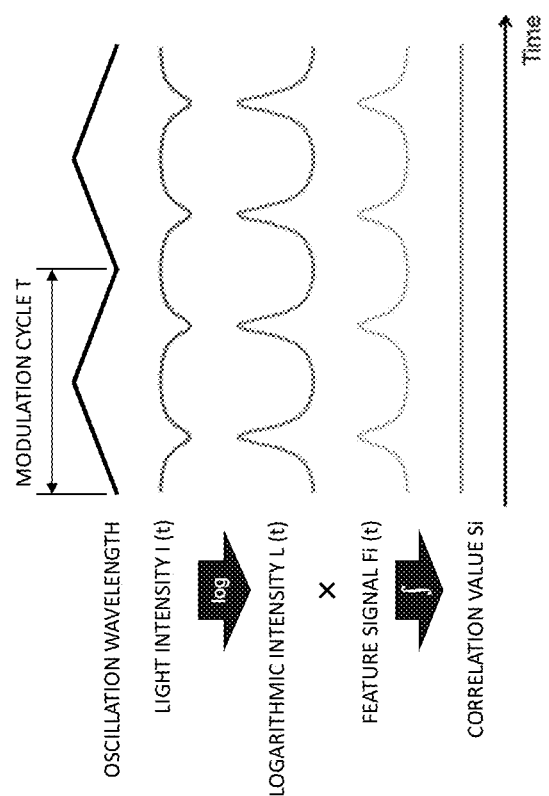
FIG. 5 is a time series graph illustrating an example of an oscillation wavelength, light intensity I (t), logarithmic intensity L (t), feature signal F$_i$ (t), and correlation value S$_i$ in the embodiment.

In this embodiment, the light source control unit 51 changes the drive current in a triangular wave shape to modulate the oscillation frequency in a triangular wave shape (see "OSCILLATION WAVELENGTH" in FIG. 5). In practice, the drive current is modulated with another function to have an oscillation frequency with a triangular wave shape. As shown in FIG. 4, the oscillation wavelength of the laser light is modulated with the peak of the absorption spectrum of the halide or the vicinity thereof as the center wavelength. In addition, the light source control unit 51 may change the drive current to have a sine wave shape, a sawtooth wave shape, or any function shape, to modulate the oscillation frequency to have a sine wave shape, a sawtooth wave shape, or any function shape.

Figure 6:
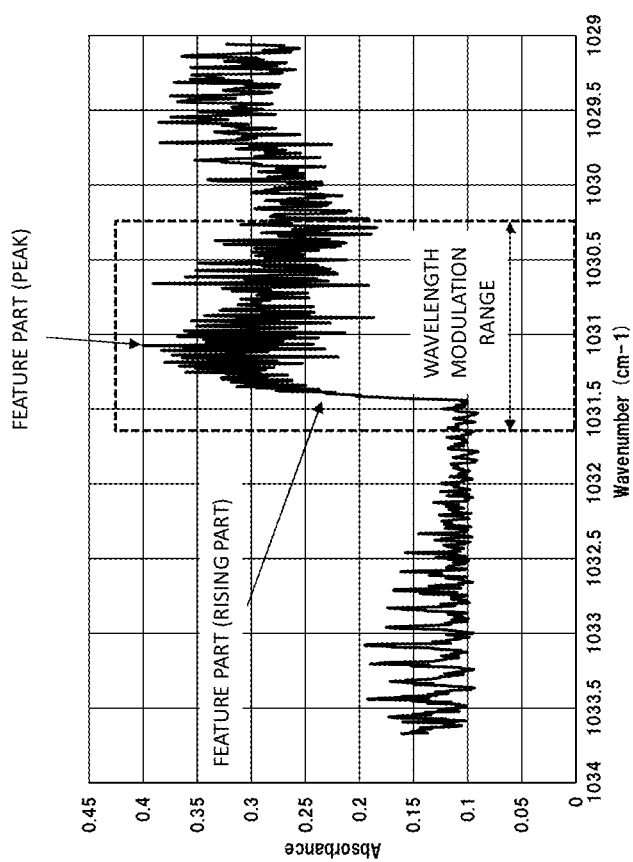
FIG. 6 is a diagram illustrating an absorption spectrum and a wavelength modulation range of SiF$_4$.

Specifically, when the halide as the component to be measured is $SiF_4$, the light source control unit 51 modulates the wavelength modulation range of the laser light such that the wavenumber width of the range includes a part or all of 1030.5 cm$^{-1}$ to 1031.5 cm$^{-1}$ as shown in FIG. 6. Here, the light source control unit 51 modulates the wavelength modulation range such that the wavenumber width of the range includes a part or all of 1029 cm$^{-1}$ to 1032 cm$^{-1}$. Such a modulation can include both rising and peak feature parts of the absorption spectrum of SiF$_4$.

Figure 7:
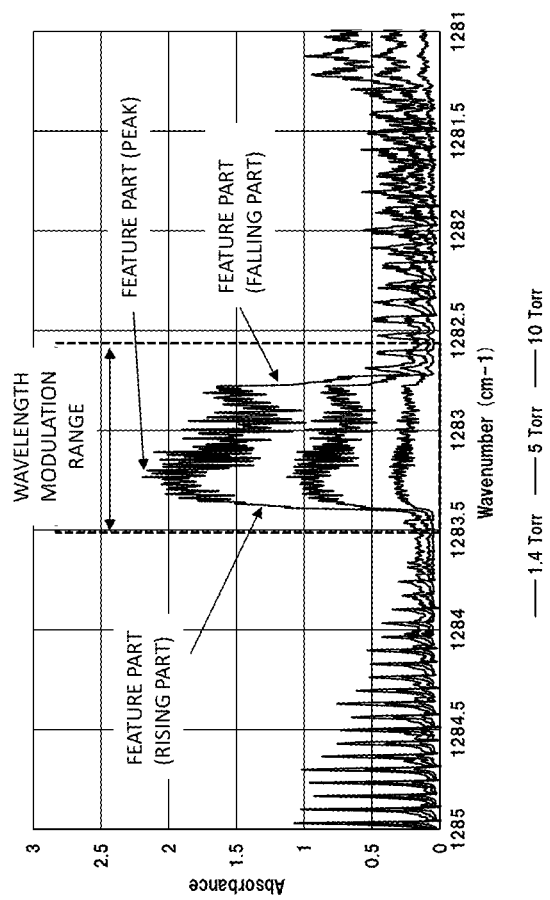
FIG. 7 is a diagram illustrating an absorption spectrum and a wavelength modulation range of CF$_4$.

When the fluoride as the component to be measured is CF$_4$, the light source control unit 51 modulates the wavelength modulation range such that the wavenumber width of the range includes a part or all of 1282.5 cm$^{-1}$ to 1283.5 cm$^{-1}$ as shown in FIG. 7. Here, the light source control unit 51 modulates the wavelength modulation range such that the wavenumber width of the range includes a part or all of 1281.5 cm$^{-1}$ to 1284.5 cm$^{-1}$. Such a modulation can include all the rising, peak, and falling feature parts of the absorption spectrum of CF$_4$.

The signal processing unit 52 includes a logarithmic operation unit 52a, a correlation value calculation unit 52b, a storage unit 52c, and a concentration/partial pressure calculation unit 52d.

The logarithmic operation unit 52a performs logarithmic operation on the light intensity signal which is an output signal of the light detector 4. The function I (t) indicating the change with time of the light intensity signal obtained by the light detector 4 is expressed as "LIGHT INTENSITY I (t)" in FIG. 5, and it becomes like "LOGARITHMIC INTENSITY L (t)" in FIG. 5 with the logarithmic operation.

The correlation value calculation unit 52b calculates a correlation value between an intensity-related signal related to the intensity of a sample light and each of a plurality of predetermined feature signals. The feature signal is a signal for extracting a waveform feature of the intensity-related signal by correlating with the intensity-related signal. As the feature signal, various signals corresponding to waveform features to be extracted from a sine wave signal or other intensity-related signals may be used, for example.

Hereinafter, an example in which a feature signal other than a sine wave signal is used will be described. The correlation value calculation unit 52b calculates a correlation value of the intensity-related signal related to the intensity of the sample light and each of a plurality of feature signals with which a correlation different from a sine wave signal (sine function) is obtained with respect to the intensity-related signal. Here, the correlation value calculation unit 52b uses the light intensity signal (logarithmic intensity L (t)) subjected to logarithmic operation as the intensity-related signal.

The correlation value calculation unit 52b calculates a plurality of sample correlation values $S_i$, which are correlation values between the intensity-related signal of the sample light and the plurality of feature signals, with the following formula (Mathematical Formula 1) using the feature signals $F_i$ (t) (i=1, 2, . . . , n) of a number larger than a sum of the number of types of the component to be measured (halide) and the number of types of the interference component. T in the formula (Mathematical Formula 1) is a modulation cycle.

$$S_i = \int_0^T L(t) \cdot F_i(t) dt \, (i=1,2,\ldots,n)$$

$$R_i = \int_0^T L_0(t) \cdot F_i(t) dt \, (i=1,2,\ldots,n)$$

$$S_i' = S_i - R_i \quad \text{[Mathematical Formula 1]}$$

The correlation value calculation unit 52b preferably calculates, in calculating the sample correlation value, corrected sample correlation values $S_i'$ obtained by subtracting a reference correlation value $R_i$, which is a correlation value between the intensity-related signal $L_0$ (t) of reference light and the plurality of feature signals $F_i$ (t), from correlation values $S_i$ between the intensity-related signal L (t) of the sample light and the plurality of feature signals $F_i$ (t) as in the formula (Mathematical Formula 1). As a result, the offset included in the sample correlation value is removed, a correlation value proportional to the concentration or partial pressure of the component to be measured and the concentration or partial pressure of the interference component is obtained, and the measurement error can be reduced. The reference correlation value does not have to be subtracted.

Here, the acquisition timing of the reference light is at the same time as the sample light, before and after the measurement, or any timing. The intensity-related signal or the reference correlation value of the reference light may be acquired in advance and stored in the storage unit 52c. As a method for simultaneously acquiring the reference light, for example, it is conceivable that two light detectors 4 are provided, and the modulated light from the laser light source 3 is split by a beam splitter or the like, one is for sample light measurement, and the other is for reference light measurement.

In the present embodiment, the correlation value calculation unit 52b uses, as the plurality of feature signals $F_i$ (t), a function with which the waveform feature of the logarithmic intensity L (t) can be more easily grasped than with the sine function. In the case of a sample gas containing a component to be measured and one interference component, it is conceivable to use two or more feature signals $F_1$ (t) and $F_2$ (t), and for example, it is conceivable to use a function based on the Lorentzian function close to a form of the absorption spectrum and a differential function of a function based on the Lorentzian function as the two feature signals $F_1$ (t) and $F_2$ (t). As the feature signal, instead of the function based on the Lorentzian function, a function based on the Voigt function, a function based on a Gaussian function, or the like may also be used. Using such a function for the feature signal can obtain a larger correlation value than using the sine function and can improve the measurement accuracy.

Here, it is desirable to adjust the offset such that the feature signal becomes zero when the DC component is removed, that is, when the feature signal is integrated with the modulation period. The influence when the offset is added to the intensity-related signal because of the variation in the light intensity can be removed in this manner. Instead of removing the DC component of the feature signal, the DC component of the intensity-related signal may be removed, or the DC components of both the feature signal and the intensity-related signal may be removed. In addition, sample values of absorption signals of the component to be measured and/or the interference component, or those imitating the absorption signals may be used as the feature signal.

Setting the two feature signals $F_1$ (t) and $F_2$ (t) to be a sequence of orthogonal functions or a sequence of functions close to a sequence of orthogonal functions can more efficiently extract the feature of the logarithmic intensity L (t) and can obtain the concentration or partial pressure obtained by simultaneous equations to be described later with high accuracy.

The storage unit 52c stores a single correlation value that is a correlation value per unit concentration or per unit partial pressure of the component to be measured and each of the interference components obtained from each strength-related signal and the plurality of feature signals $F_i$ (t) when the component to be measured and each of the interference components are present alone. The plurality of feature signals $F_i$ (t) used to obtain the single correlation value is the same as the plurality of feature signals $F_i$ (t) used in the correlation value calculation unit 52b.

Here, when storing the single correlation value, the storage unit 52c desirably stores the single correlation value that is corrected by subtracting the reference correlation value from the correlation value when the component to be measured and each interference component are present alone and then converting the result into a value per unit concentration or per unit partial pressure. As a result, the offset included in the single correlation value is removed, a correlation value proportional to the concentration or partial pressure of the component to be measured and the concentration or partial pressure of the interference component is obtained, and the measurement error can be reduced. The reference correlation value does not have to be subtracted.

The concentration/partial pressure calculation unit 52d calculates the concentration or partial pressure of the component to be measured using the plurality of sample correlation values obtained by the correlation value calculation unit 52b.

Specifically, the concentration/partial pressure calculation unit 52d calculates the concentration or partial pressure of the component to be measured based on the plurality of sample correlation values obtained by the correlation value calculation unit 52b and the plurality of single correlation values stored in the storage unit 52c. More specifically, the concentration/partial pressure calculation unit 52d calculates the concentration or partial pressure of the component to be measured (halide) by solving simultaneous equations including the plurality of sample correlation values obtained by the correlation value calculation unit 52b, the plurality of single correlation values stored in the storage unit 52c, the concentration or partial pressure of the component to be measured, and the concentration or partial pressure of each interference component. The signal processing unit 52 may also correct the concentration or partial pressure of the halide obtained by the concentration/partial pressure calculation unit 52d using the total pressure obtained by the pressure sensor 7.

Next, an example of the operation of the gas analysis device 100 will be described also as detailed description of each unit. Hereinafter, a case where one halide (for example, $SiF_4$) and one interference component are contained in the gas is assumed.

The interference component is a component having an absorption spectrum overlapping the absorption spectrum of $SiF_4$, and (1) the etching gas itself introduced into the chamber 200, (2) radical species generated by plasma or the like in the chamber 200 and a protective film forming species of a side wall, or (3) a by-product generated in etching processing may be considered. Specific examples of the interference component include $Cl_2$, $SF_6$, $C_4F_8$, $CHF_3$, $CH_2F_2$, $NF_3$, HF, $SiCl_4$, $SiCl_2$, CO, $O_2$, $N_2$, and FCN.

<Reference Measurement>

First, the light source control unit 51 controls the laser light source 3 to modulate the oscillation wavelength of laser light within a predetermined wavelength modulation range at the modulation frequency and with the peak of the absorption spectrum of the halide or the vicinity thereof as the center. Before a reference measurement using span gases, a reference measurement using a zero gas may be performed to measure the reference correlation value.

Next, span gases (gases having known component concentrations or partial pressures) are introduced into the gas cell 2 by an operator or automatically, and reference measurement is performed. This reference measurement is performed on a span gas in which a halide is present alone and a span gas in which an interference component is present alone.

Specifically, in the reference measurement, the logarithmic operation unit 52a receives the output signal of the light detector 4 and calculates the logarithmic intensity L (t). Then, the correlation value calculation unit 52b calculates correlation values between the logarithmic intensity L (t) and two feature signals $F_1$ (t) and $F_2$ (t), and calculates a single correlation value that is a correlation value of each span gas per unit concentration or per unit partial pressure by dividing a value obtained by subtracting the reference correlation value from the correlation value per unit concentration or per unit partial pressure of the span gas. Instead of calculating the single correlation value, the relationship between the concentration or partial pressure of the span gas and the correlation value of the span gas may be stored.

It is specifically as follows.

Figure 8:
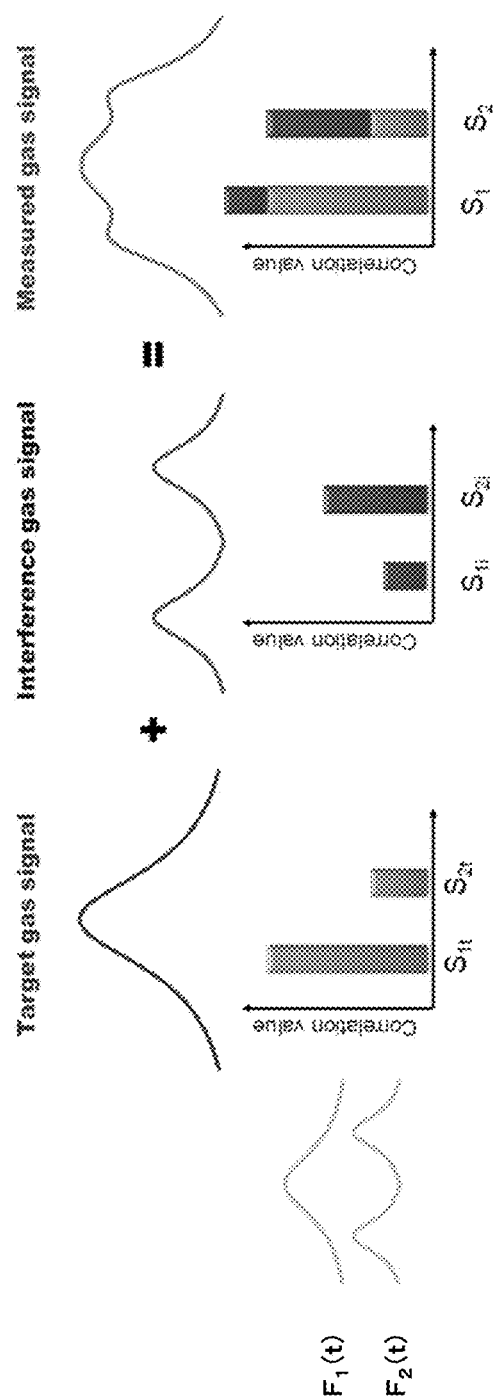
FIG. 8 is a conceptual diagram of a concentration or partial pressure calculation using a single correlation value and a sample correlation value according to the embodiment.

The correlation value calculation unit 52b calculates correlation values $S_{1t}$ and $S_{2t}$ of the halide when a span gas in which the halide is present alone is introduced into the gas cell 2 (see FIG. 8). Here, $S_{1t}$ is a correlation value with a first feature signal, and $S_{2t}$ is a correlation value with a second feature signal. Then, the correlation value calculation unit 52b calculates single correlation values $s_{1t}$ and $s_{2t}$ by subtracting the reference correlation value $R_i$ from the correlation values $S_{1t}$ and $S_{2t}$ and dividing the results by the concentration or partial pressure $c_t$ of the span gas of the halide. The concentration or partial pressure $c_t$ of the span gas of the halide is previously input to the signal processing unit 52 by a user or the like.

The correlation value calculation unit 52b calculates correlation values $S_{1i}$ and $S_{2i}$ of the interference component when a span gas in which the interference component is present alone is introduced into the gas cell 2 (see FIG. 8). Here, $S_{1i}$ is a correlation value with the first feature signal, and $S_{2i}$ is a correlation value with the second feature signal. Then, the correlation value calculation unit 52b calculates single correlation values $s_{1i}$ and $s_{2i}$ by subtracting the reference correlation value $R_i$ from the correlation values $S_{1i}$ and $S_{2i}$ and dividing the results by the concentration or partial pressure $c_i$ of the span gas of the interference component. The concentration or partial pressure $c_i$ of the span gas of the interference component is previously input to the signal processing unit 52 by a user or the like.

The single correlation values $s_{1t}$, $s_{2t}$, $s_{1i}$, and $s_{2i}$ calculated as described above are stored in the storage unit 52c. The reference measurement may be performed before product shipment or may be periodically performed.

<Sample Measurement>

The light source control unit 51 controls the laser light source 3 to modulate the oscillation wavelength of laser light within a predetermined wavelength modulation range at the modulation frequency and with the peak of the absorption spectrum of the halide or the vicinity thereof as the center.

Next, the gas is introduced into the gas cell 2 by an operator or automatically, and sample measurement is performed.

Specifically, in the sample measurement, the logarithmic operation unit 52a receives the output signal of the light detector 4 and calculates the logarithmic intensity L (t). Then, the correlation value calculation unit 52b calculates sample correlation values $S_1$ and $S_2$ of the logarithmic intensity L (t) and the plurality of feature signals $F_1$ (t) and $F_2$ (t), and calculates sample correlation values $S_1'$ and $S_2'$ obtained by subtracting the reference correlation value $R_i$ from the correlation values (see FIG. 8).

Then, the concentration/partial pressure calculation unit 52d solves the following simultaneous equations with two unknowns, the equations including the sample correlation values $S_1'$ and $S_2'$ calculated by the correlation value calculation unit 52b, the single correlation values $s_{1t}$, $s_{2t}$, $s_{1i}$, and $s_{2i}$ of the storage unit 52c, the concentrations $C_{tar}$ of the halide, and the concentration $C_{int}$ of each interference component.

$$s_{1t}C_{tar} + s_{1i}C_{int} = S_1'$$

$$s_{2t}C_{tar} + s_{2i}C_{int} = S_2' \qquad \text{[Mathematical Formula 2]}$$

As a result, it is possible to determine the concentration or partial pressure $C_{tar}$ of the halide from which the interference influence has been removed with a simple and reliable operation of solving the simultaneous equations of the above formula (Mathematical Formula 2).

Even when two or more interference components may be assumed to be present, the concentration or partial pressure of the halide from which the interference influence has been removed can be similarly determined by adding single correlation values by the number of interference components and solving simultaneous equations with the same number of unknowns as the number of component species.

That is, in general, when n kinds of gases are present as the sum of a halide and interference components, the following formula (Mathematical Formula 3) holds where $s_{mk}$ is the single correlation value of the k-th gas species in the m-th feature signal, $C_k$ is the concentration or partial pressure of the k-th gas species, and $S_m'$ is the sample correlation value in the m-th feature signal $F_m$ (t).

$$s_{11}C_1 + s_{12}C_2 + s_{13}C_3 + \ldots + s_{1n}C_n = S_1' \quad \text{[Mathematical Formula 3]}$$
$$s_{21}C_1 + s_{22}C_2 + s_{23}C_3 + \ldots + s_{2n}C_n = S_2'$$
$$s_{31}C_1 + s_{32}C_2 + s_{33}C_3 + \ldots + s_{3n}C_n = S_3'$$
$$\vdots$$
$$s_{n1}C_1 + s_{n2}C_2 + s_{n3}C_3 + \ldots + s_{nn}C_n = S_n'$$

The concentration or partial pressure of each gas of the halide and the interference components may be determined by solving simultaneous equations with n unknowns represented by the formula (Mathematical Formula 3).

Figure 9:
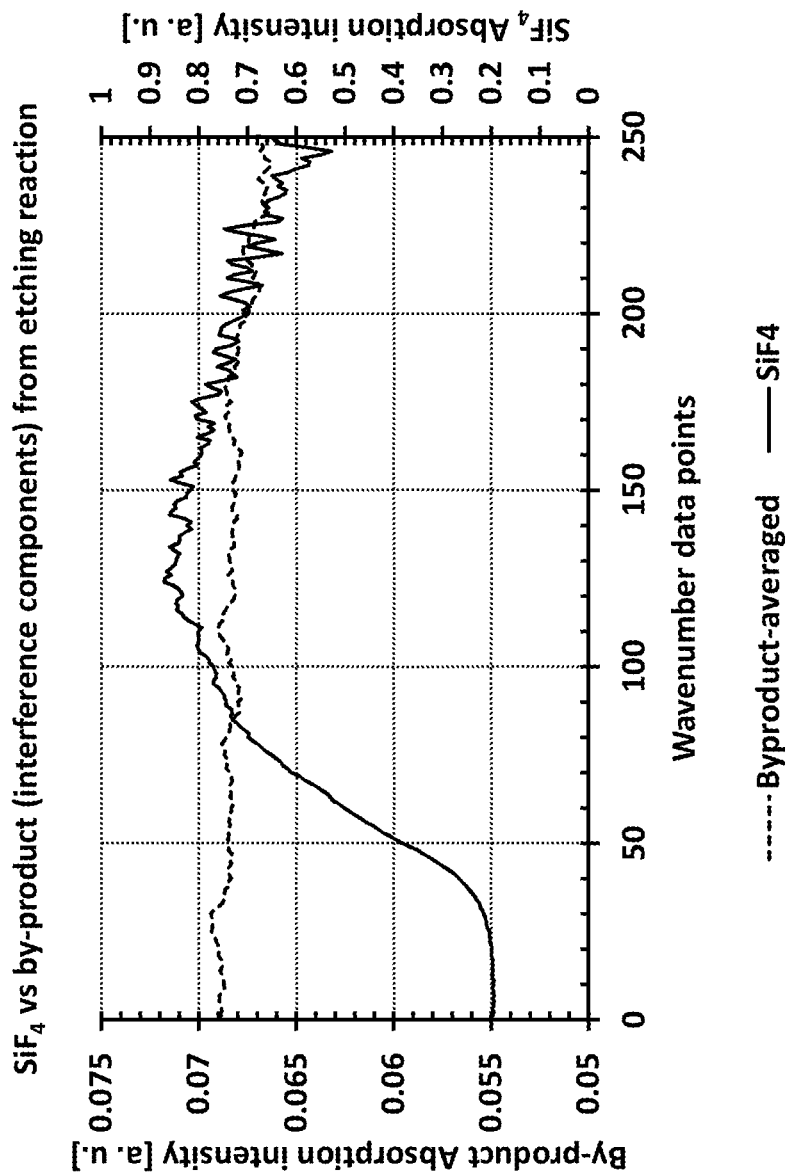
FIG. 9 is a diagram illustrating a light absorption signal of SiF$_4$ acquired by the gas analysis device of the embodiment and a light absorption signal of a by-product serving as an interference component generated in a semiconductor manufacturing process.

FIG. 9 illustrates a light absorption signal of $SiF_4$ acquired by the gas analysis device 100 of the present embodiment and a light absorption signal of a by-product serving as an interference component generated in a semiconductor manufacturing process when the component to be measured is $SiF_4$. With a modulation to have a wavelength modulation range including 1030.5 $cm^{-1}$ to 1031.5 $cm^{-1}$, the difference in features of light absorption signal between $SiF_4$ and the by-product is made clear, and the interference influence can be reduced by the above-described interference correction technique. The light absorption signal of $SiF_4$ has a rising part from a valley or a skirt in the vicinity of the wavenumber data point 10 to a peak in the vicinity of the wavenumber data point 125 as a feature part, but the light absorption signal of the by-product does not have a feature part like $SiF_4$. This is the difference in features of light absorption signal between $SiF_4$ and the by-product.

Figure 10:
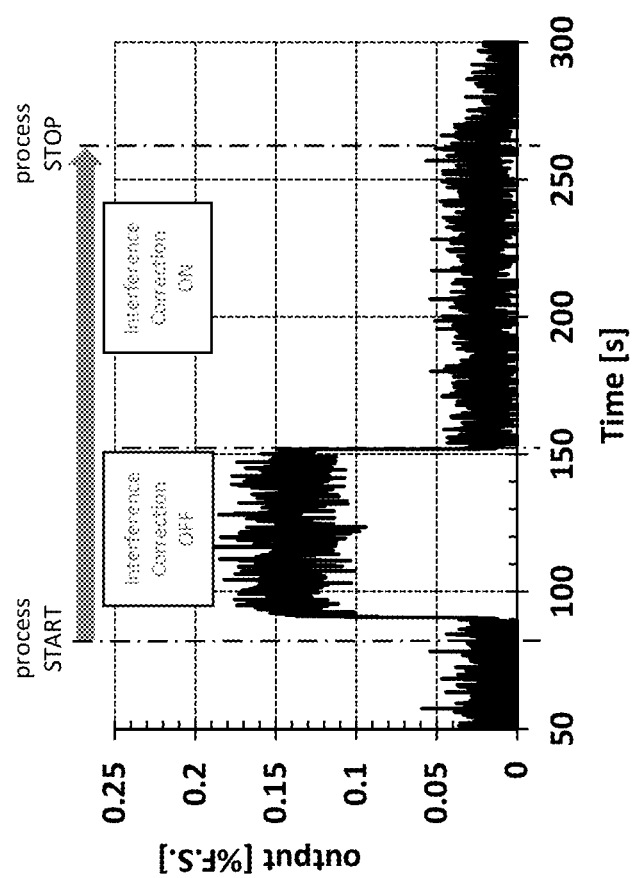
FIG. 10 is a graph showing concentration indication values of SiF$_4$ when no interference influence correction is performed (Interference Correction OFF) and when the interference influence correction is performed (Interference Correction ON) in the gas analysis device of the embodiment.

FIG. 10 is a graph showing concentration indication values of $SiF_4$ of the gas analysis device 100 of the present embodiment when a by-product as an interference component is generated in the chamber. When the above-described interference correction technique is not applied, an interference influence due to a by-product is generated, but when the above-described interference correction technique is applied, the interference influence can be sufficiently reduced. In FIGS. 9 and 10, the relationship between $SiF_4$ and the by-product is shown, and it is presumed that a similar relationship is formed in the case of $CF_4$.

Effects of Present Embodiment

The gas analysis device 100 of the present embodiment configured as described above, in which the gas cell 2 decompressed to a predetermined pressure lower than atmospheric pressure is irradiated with laser light whose wavelength is modulated in the wavelength modulation range including the characteristic part of the light absorption signal of the halide, can accurately grasp the feature of the light absorption signal of the halide. Here, since the gas cell 2 is decompressed to a predetermined pressure, a sharper peak than that of the light absorption signal of the halide under atmospheric pressure is obtained, and the interference influence of the interference component on the light absorption signal of the halide can be reduced. In the conventional NDIR, the light absorption spectrum of a halide cannot be obtained. However, the present invention, in which a light absorption spectrum can be obtained, can reduce the interference influence using the spectrum analysis technique even when absorption by a plurality of components interferes the halide.

The present embodiment, in which the correlation value $S_i$ between the logarithmic intensity L (t), which is an intensity-related signal related to the intensity of the sample light, and each of the plurality of feature signals $F_i$ (t) is calculated with respect to the logarithmic intensity L (t), and the concentration or partial pressure of the halide is calculated using a plurality of calculated correlation values $S_i$, can grasp the feature of the absorption signal with few variables without converting the absorption signal into an absorption spectrum, and can measure the concentration or partial pressure of the halide with a simple operation without performing a complicated spectrum arithmetic processing. For example, several hundreds of data points need to be used in typical spectral fitting, but in the present embodiment, the concentration or partial pressure can be calculated as accurately as in the typical spectral fitting with at most several to several tens of correlation values. This can reduce the load of the arithmetic processing, eliminate the need of an advanced arithmetic processing device, reduce the cost of the gas analysis device 100, and reduce the size of the gas analysis device 100.

OTHER EMBODIMENTS

The logarithmic operation unit 52a of the embodiment performs logarithmic operation of the light intensity signal of the light detector 4. Alternatively, the logarithmic operation unit may calculate the logarithm of the ratio between the intensity of the sample light and the intensity of modulated light as reference light (so-called absorbance) using the light intensity signal of the light detector 4, for example. At this time, the logarithmic operation unit 52a may calculate the absorbance by calculating the logarithm of the intensity of the sample light, calculating the logarithm of the intensity of the modulated light, and then subtracting the logarithms, or may calculate the absorbance by obtaining the ratio between the intensity of the sample light and the intensity of the modulated light, and then taking the logarithm of the ratio.

The correlation value calculation unit 52b of the embodiment calculates a correlation value between the intensity-related signal and the feature signal. Alternatively, the correlation value calculation unit may calculate an inner product value of the intensity-related signal and the feature signal.

In the above embodiment, the storage unit 52c stores the single correlation value corrected using the reference correlation value. Alternatively, the storage unit 52c may store the single correlation value before correction, and the concentration/partial pressure calculation unit 52d may subtract the reference correlation value from the single correlation value before correction and obtain a corrected single correlation value converted per unit concentration or per unit partial pressure.

The plurality of feature signals are not limited to the above-described embodiment as long as they are functions different from each other. As a feature signal, a function indicating a waveform (sample spectrum) of light intensity or logarithmic intensity obtained by flowing a span gas having a known concentration or partial pressure may be used, for example. When the concentration of one halide is measured, at least one feature signal is provided.

Further, a single correlation value and a sample correlation value larger in number than the number of gas types may be obtained using more types of feature signal than n, simultaneous equations with more unknowns than the number of gas types may be created, and each component concentration or partial pressure may be determined by the least squares method, which enables determination of the concentration or partial pressure with a small error even with respect to the measurement noise.

Figure 11:
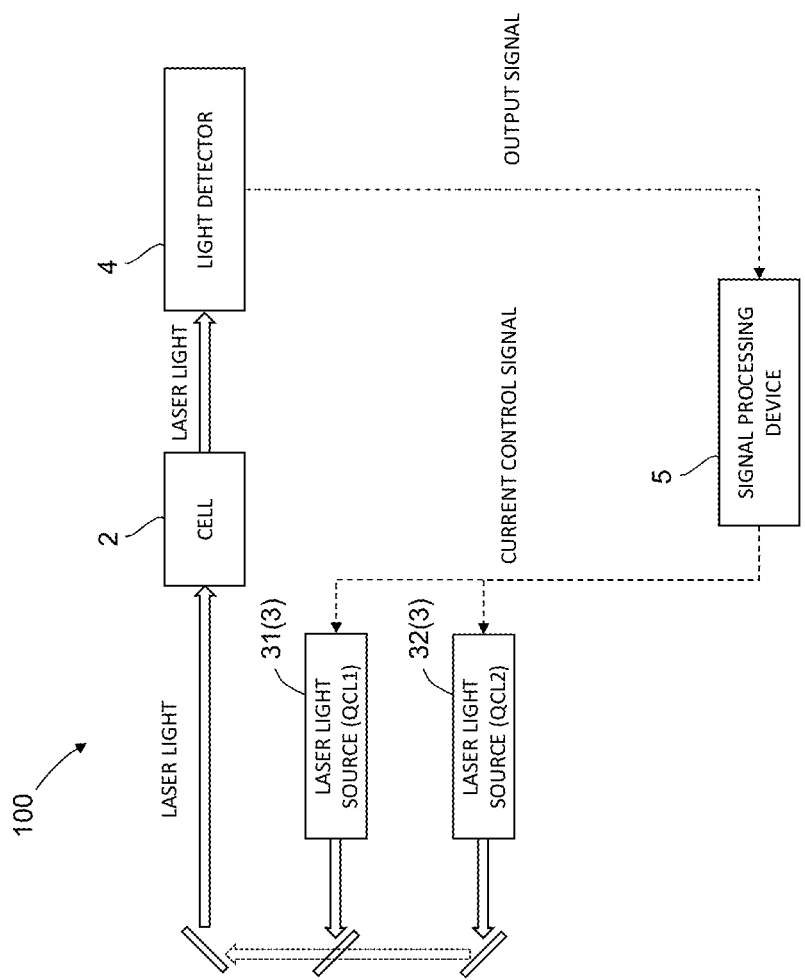
FIG. 11 is an overall schematic diagram of a gas analysis unit according to a modification of the embodiment.

As illustrated in FIG. 11, the gas analysis device 100 may include a plurality of laser light sources 3 as light sources that irradiate the gas cell 2 with laser light. Here, it is conceivable that the gas analysis device 100 measures the concentration or partial pressure of a plurality of halides ($SiF_4$, $CF_4$, etc.). In such a case, the gas analysis device 100 includes a first laser light source 31 for $SiF_4$ whose wavelength is modulated to have a wavenumber width of the wavelength modulation range including a part or all of 1030.5 $cm^{-1}$ to 1031.5 $cm^{-1}$, and a second laser light source 32 for $CF_4$ whose wavelength is modulated to have a wavenumber width of the wavelength modulation range including a part or all of 1282.5 $cm^{-1}$ to 1283.5 $cm^{-1}$. The first laser light source 31 and the second laser light source 32 are pulse-oscillated by the light source control unit 51 to have the same oscillation cycle and different oscillation timings. The signal processing device 5 separates the signal of each of the plurality of laser light sources 31 and 32 from the light intensity signal obtained by the light detector 4, and calculates the concentration or partial pressure of the component to be measured corresponding to each of the laser light sources 31 and 32 using the separated light absorption signal of each of the laser light sources 31 and 32. The calculation of the concentration or partial pressure of the component to be measured by the signal processing unit 52 is the same as in the embodiment.

The signal processing unit of the embodiment exerts the functions of a correlation value calculation unit that calculates a correlation value depending on the concentration or partial pressure of the component to be measured using an intensity-related signal related to the intensity of the sample light and a feature signal with which a predetermined correlation is obtained with respect to the intensity-related signal, and a concentration/partial pressure calculation unit that calculates the concentration or partial pressure of the component to be measured using the correlation value obtained by the correlation value calculation unit. Alternatively, other operation methods may be used.

Figure 12:
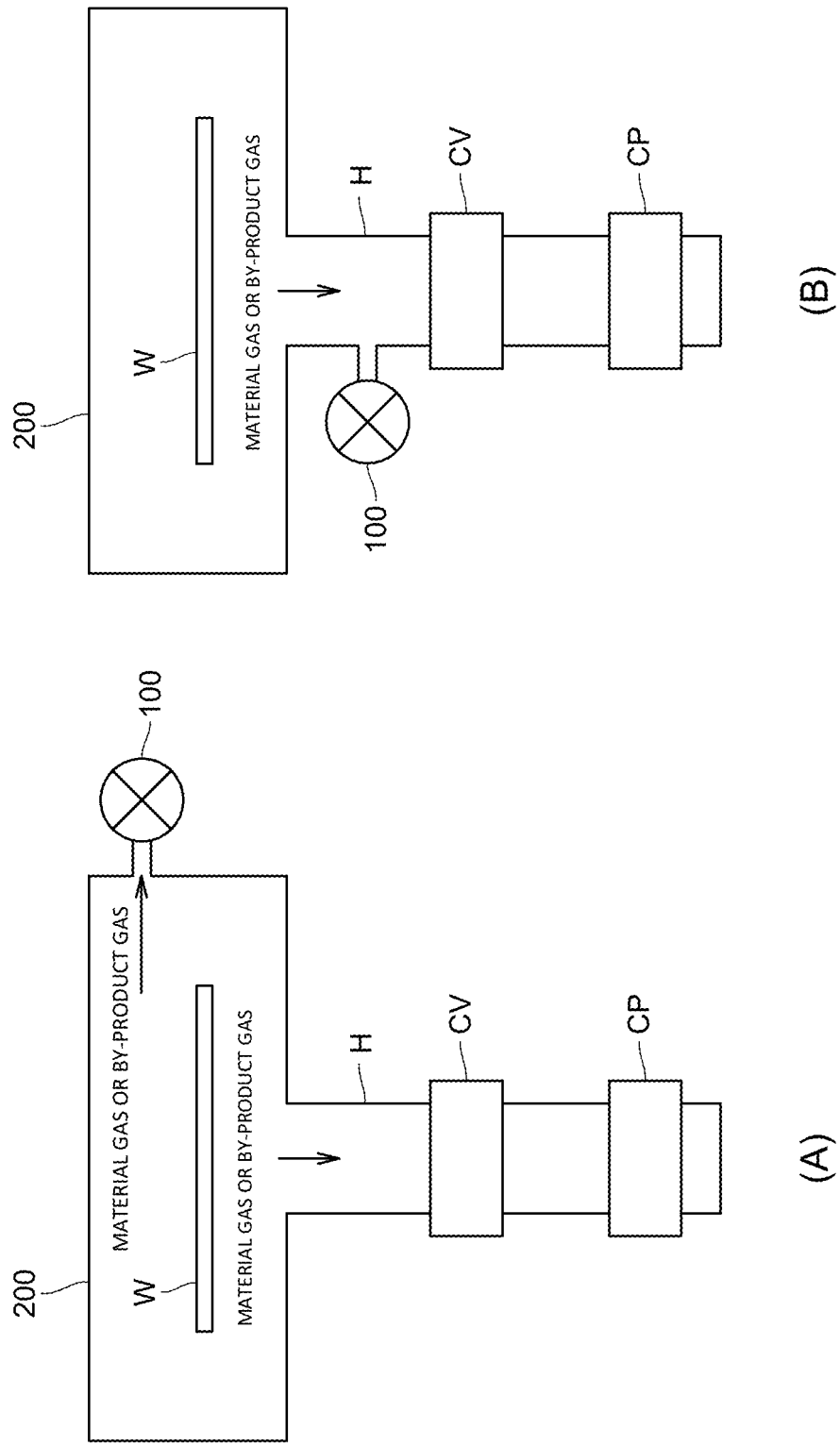
FIG. 12 is a diagram schematically illustrating a modification of the semiconductor manufacturing apparatus incorporating the present invention.
Figure 13:
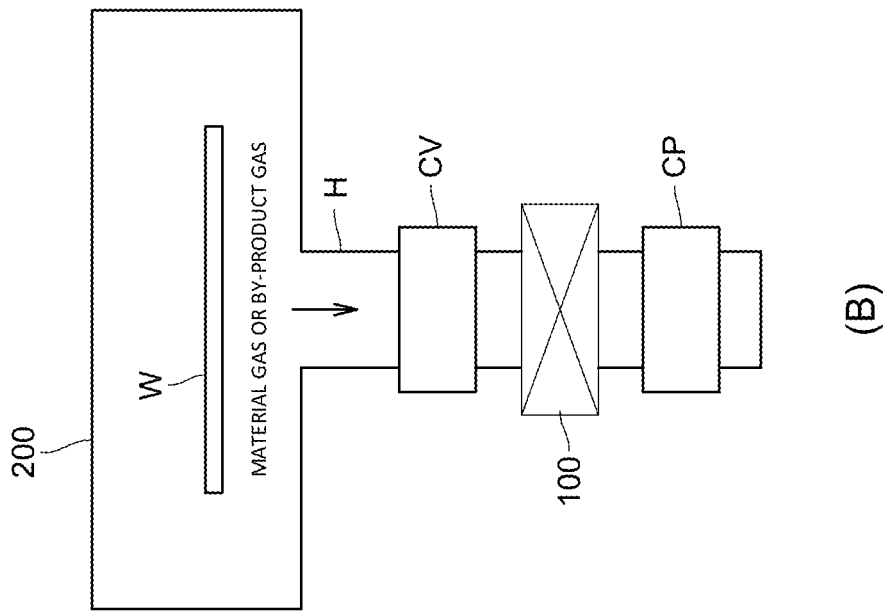
FIG. 13 is a diagram schematically illustrating a modification of the semiconductor manufacturing apparatus incorporating the present invention.
Figure 13:
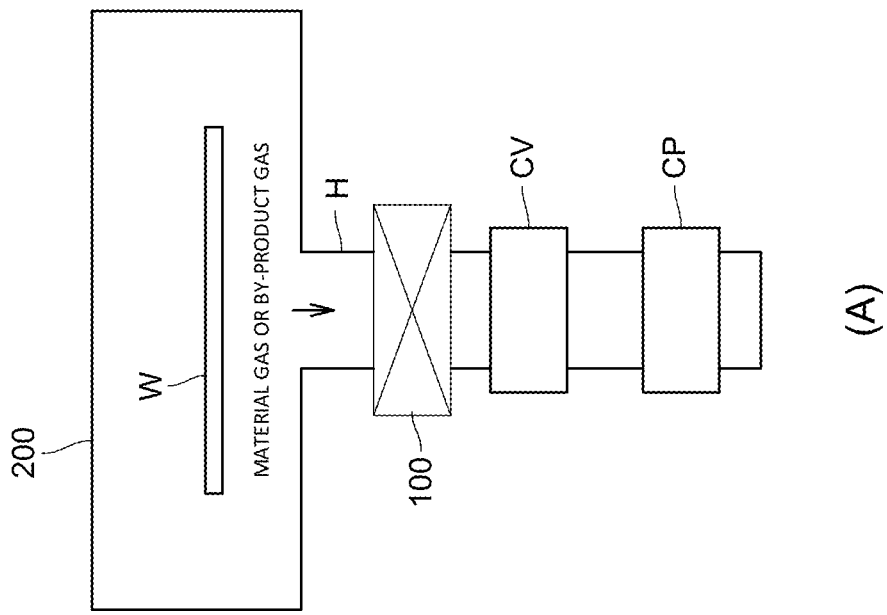

The installation position of the gas analysis device of the present invention is not limited to the embodiment, and as illustrated in FIG. 12(A), the gas analysis device may be provided to be connected to a port provided on a side wall of the chamber to analyze the gas diffused in the chamber 200, or as illustrated in FIG. 12(B), the gas analysis device may be provided to be connected to a port provided in the piping H immediately below the chamber 200. As illustrated in FIGS. 13(A) and (B), the gas analysis device 100 may be provided such that the gas cell 2 is incorporated in the piping H. In this case, the piping H penetrates the gas cell 2.

Figure 14:
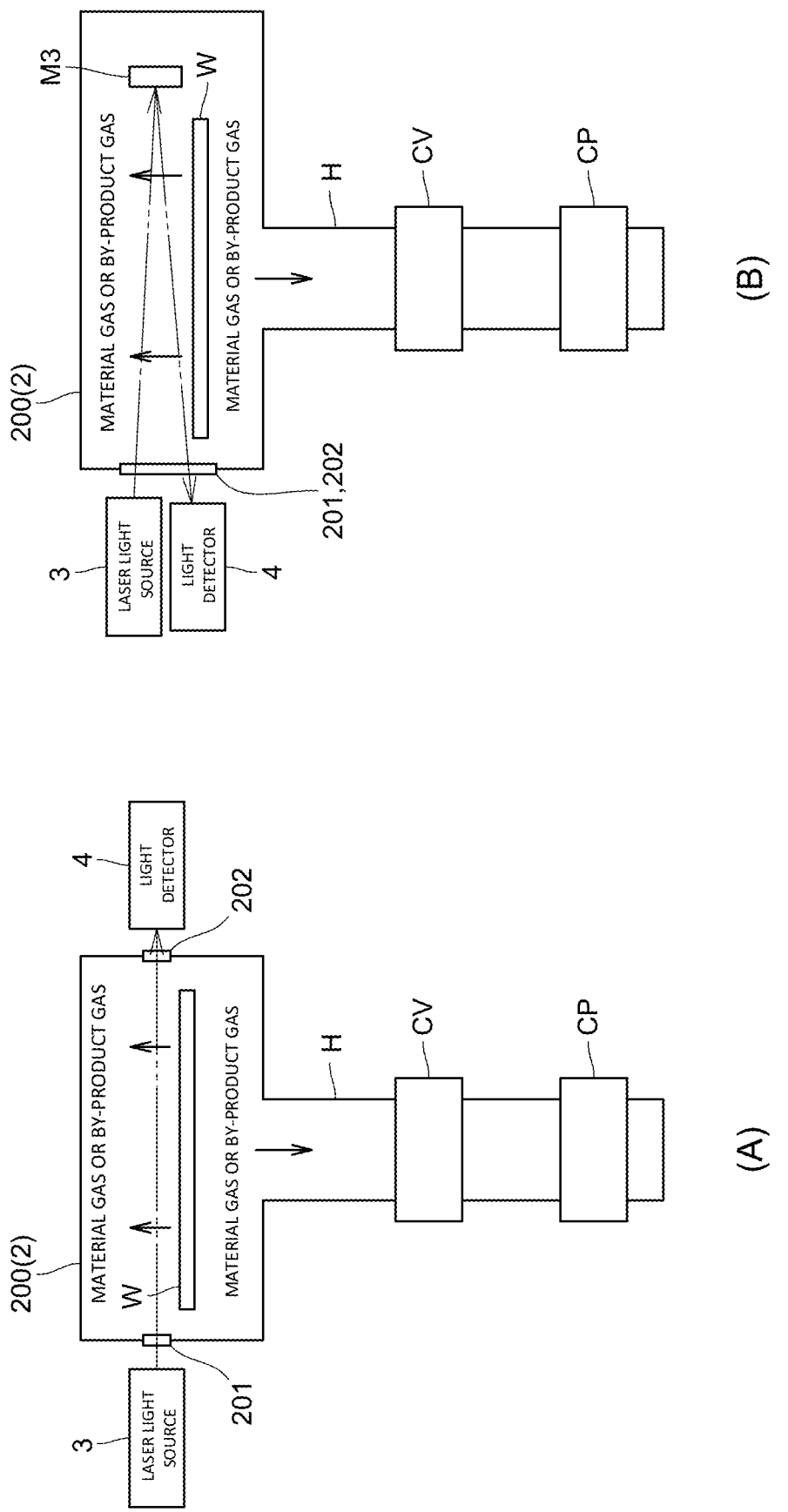
FIG. 14 is a diagram schematically illustrating a modification of the semiconductor manufacturing apparatus incorporating the present invention.
Figure 15:
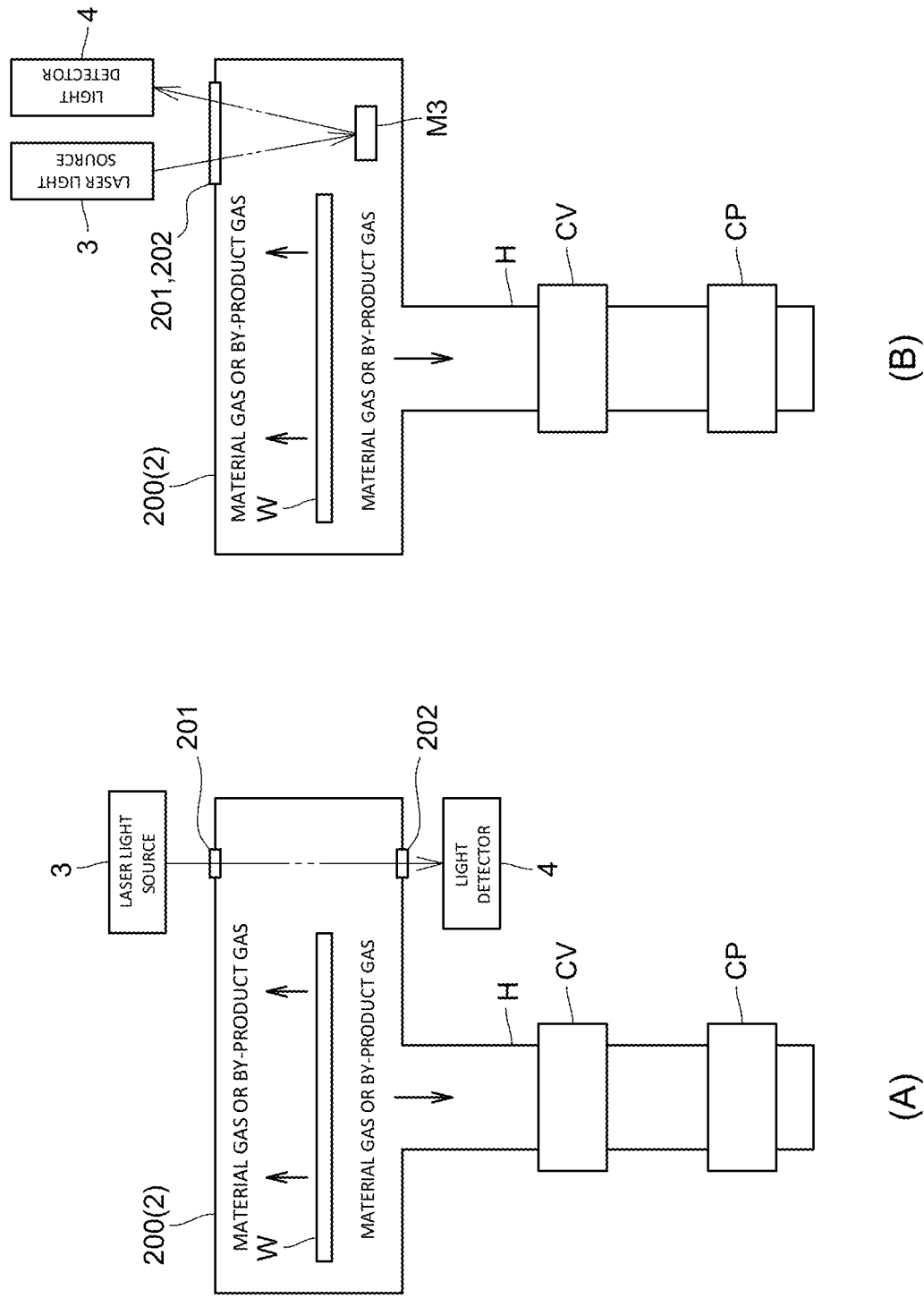
FIG. 15 is a diagram schematically illustrating a modification of the semiconductor manufacturing apparatus incorporating the present invention.

As illustrated in FIG. 14(A), a light entrance window 201 and a light exit window 202 may be formed on the left and right side walls of the chamber 200, and the chamber 200 itself may serve a gas cell. With this configuration, the gas generated from the wafer W can be directly measured. Even in such a configuration, the device can be used as an endpoint monitor of reactive ion etching (RIE) for the wafer W, for example. As illustrated in FIG. 14(B), a reflection mirror M3 may be disposed inside the chamber 200, and the laser light source 3 and the light detector 4 may be collectively disposed on one side wall side of the chamber 200. This configuration enables the device to flexibly cope with the restriction of the installation space and to increase the optical path length. Further, as illustrated in FIG. 15(A), the light entrance window 201 and the light exit window 202 may be formed on the upper and lower walls of the chamber 200, and the chamber 200 itself may serve a gas cell, or as illustrated in FIG. 15(B), the reflection mirror M3 may be disposed inside the chamber 200, and the laser light source 3 and the light detector 4 may be collectively disposed on the upper wall side or the lower wall side of the chamber 200. In FIGS. 14(B) and 15(B), the reflection mirror M3 may be provided inside the chamber 200 or outside the chamber 200 with a window interposed therebetween.

The light source may be another type of laser instead of a semiconductor laser, or any light source may be used as long as the light source is a single wavelength light source having a sufficient line width to secure measurement accuracy and on which wavelength modulation can be performed. The intensity of the light source may be modulated.

Other various modifications and combinations of the embodiment may be made without departing from the spirit of the present invention.

INDUSTRIAL APPLICABILITY

According to the present invention, the concentration or partial pressure of a halide contained in a material gas used in a semiconductor manufacturing process or a by-product gas generated in a semiconductor manufacturing process can be measured with high accuracy.

The invention claimed is:

1. A gas analysis device for analyzing a concentration or partial pressure of a halide contained in a material gas used in a semiconductor manufacturing process or a by-product gas generated in a semiconductor manufacturing process, the gas analysis device comprising:
  a gas cell into which the material gas or the by-product gas is introduced;
  a laser light source that irradiates the gas cell with laser light whose wavelength is modulated;
  a light detector that detects the laser light transmitted through the gas cell;

a heating mechanism that heats the gas cell; and
a signal processing unit that calculates the concentration or partial pressure of the halide by using a light absorption signal of the halide obtained from an output signal of the light detector,
wherein
the gas cell is provided with a pair of reflection mirrors inside to multiply reflect the laser light,
the gas cell is decompressed to 10 Torr or less, and
the laser light source modulates the wavelength of the laser light in a predetermined wavelength modulation range, and,
wherein the predetermined wavelength modulation range includes a feature part including a peak and a rising part or a falling part of the light absorption signal of the halide, but does not include a feature part including a peak and a rising portion or a falling portion of a light absorption signal of an interference component, and
wherein the halide is $SiF_4$ or $CF_4$.

2. A gas analysis device for analyzing a concentration or partial pressure of a halide contained in a material gas used in a semiconductor manufacturing process or a by-product gas generated in a semiconductor manufacturing process, the gas analysis device comprising:
a gas cell into which the material gas or the by-product gas is introduced;
a heating mechanism that heats the gas cell;
a laser light source that irradiates the gas cell with laser light whose wavelength is modulated;
a light detector that detects the laser light transmitted through the gas cell; and
a signal processing unit that calculates the concentration or partial pressure of the halide by using a light absorption signal of the halide obtained from an output signal of the light detector,
wherein
the gas cell is provided with a pair of reflection mirrors inside to multiply reflect the laser light,
the gas cell is decompressed to 10 Torr or less, and
the laser light source modulates the wavelength of the laser light in a predetermined wavelength modulation range including a feature part of the light absorption signal of the halide,
wherein the predetermined wavelength modulation range includes a feature part including a peak and a rising part or a falling part of the light absorption signal of the halide, but does not include a feature part including a peak and a rising portion or a falling portion of a light absorption signal of an interference component,
wherein
the halide is $SiF_4$ and $CF_4$, and
the laser light source includes:
a first laser light source set to have a wavenumber width of the wavelength modulation range of 1030.5 $cm^{-1}$ to 1031.5 $cm^{-1}$; and
a second laser light source set so have a wavenumber width of the wavelength modulation range of 1281.5 $cm^{-1}$ to 1284.5 $cm^{-1}$.

3. The gas analysis device according to claim 1, wherein the signal processing unit corrects an influence of an interference component on the light absorption signal of the halide with spectral analysis to calculate the concentration or partial pressure of the halide.

4. The gas analysis device according to claim 1, further comprising a heating mechanism that heats the gas cell.

5. The gas analysis device according to claim 1, further comprising a pressure sensor that measures a pressure of the material gas or the by-product gas.

6. The gas analysis device according to claim 1, wherein the gas cell is provided in a chamber in which a semiconductor manufacturing process is performed or a piping connected to the chamber.

7. The gas analysis device according to claim 6, wherein the piping is provided with a vacuum pump that evacuates the chamber, and
the gas cell is provided closer to the chamber than the vacuum pump is.

8. The gas analysis device according to claim 7, wherein the piping is provided with a pressure control valve that controls a pressure in the chamber, the pressure control valve being provided closer to the chamber than the vacuum pump is, and
an inlet port of the piping is connected to and in communication with an upstream side of the pressure control valve, and an outlet port of the piping is connected to and in communication with a downstream side of the pressure control valve.

9. The gas analysis device according to claim 1, wherein the gas cell is formed of a chamber in which a semiconductor manufacturing process is performed.

10. A gas analysis method for analyzing a concentration or partial pressure of a halide contained in a material gas used in a semiconductor manufacturing process or a by-product gas generated in a semiconductor manufacturing process, the gas analysis method comprising:
introducing the material gas or the by-product gas into a gas cell;
heating the gas cell by using a heating mechanism;
irradiating the gas cell with laser light whose wavelength is modulated;
detecting the laser light transmitted through the gas cell; and
calculating the concentration or partial pressure of the halide by using a light absorption signal of the halide obtained from an output signal of a light detector,
wherein the gas cell is provided with a pair of reflection mirrors inside to multiply reflect the laser light, and wherein the gas cell is decompressed to 10 Torr or less, and the wavelength of the laser light is modulated in a predetermined wavelength modulation range,
wherein the predetermined wavelength modulation range includes a feature part including a peak and a rising part or a falling part of the light absorption signal of the halide, but does not include a feature part including a peak and a rising portion or a falling portion of a light absorption signal of an interference component,
wherein $SiF_4$ is provided as the halide and the wavelength modulation range is set to have a wavenumber width including a part or all of 1030.5 $cm^{-1}$ to 1031.5 $cm^{-1}$, or $CF_4$ is provided as the halide and the wavelength modulation range is set to have a wavenumber width including a part or all of 1281.5 $cm^{-1}$ to 1284.5 $cm^{-1}$.

11. The gas analysis device according to claim 3, wherein the interference component are at least one of $Cl_2$, $SF_6$, $C_4F_8$, $CHF_3$, $CH_2F_2$, $NF_3$, HF, $SiCl_4$, $SiCl_2$, CO, $O_2$, $N_2$, or FCN.

* * * * *